(12) United States Patent
Sakai et al.

(10) Patent No.: US 9,602,722 B2
(45) Date of Patent: Mar. 21, 2017

(54) COMMUNICATION APPARATUS, CONTROL METHOD FOR COMMUNICATION APPARATUS, IMAGING APPARATUS, CONTROL METHOD FOR IMAGING APPARATUS, AND PROGRAM

(71) Applicant: CANON KABUSHIKI KAISHA, Tokyo (JP)

(72) Inventors: Tatsuhiko Sakai, Tokyo (JP); Junji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/672,004

(22) Filed: Nov. 8, 2012

(65) Prior Publication Data

US 2013/0120597 A1 May 16, 2013

(30) Foreign Application Priority Data

Nov. 10, 2011 (JP) ................................. 2011-246704

(51) Int. Cl.
*H04N 5/232* (2006.01)
*H04W 52/02* (2009.01)

(52) U.S. Cl.
CPC .... *H04N 5/23241* (2013.01); *H04W 52/0277* (2013.01); *Y02B 60/50* (2013.01)

(58) Field of Classification Search
CPC .................................................. H04N 5/23241
USPC .............................................. 348/207.1, 372
See application file for complete search history.

(56) References Cited

U.S. PATENT DOCUMENTS

| 2006/0067299 | A1 | 3/2006 | Caspi |
| 2006/0068815 | A1* | 3/2006 | Caspi et al. ................... 455/466 |
| 2009/0079845 | A1* | 3/2009 | Yanagidate .............. G03B 7/16 348/222.1 |
| 2012/0082148 | A1* | 4/2012 | Sperling et al. .............. 370/338 |
| 2012/0083256 | A1* | 4/2012 | Sperling et al. ........... 455/414.2 |

(Continued)

FOREIGN PATENT DOCUMENTS

| CN | 1770717 A | 5/2006 |
| CN | 102111858 A | 6/2011 |

(Continued)

*Primary Examiner* — James Hannett
(74) *Attorney, Agent, or Firm* — Canon USA, Inc. I.P. Division (57) ABSTRACT

A communication apparatus has a communication control function, which enables the apparatus to operate as a control apparatus that forms a wireless network and controls the wireless network, and has an apparatus function other than the communication control function. The communication apparatus includes a determination unit configured to determine whether priority is to be given to the apparatus function over the communication control function in the case that an instruction to implement the apparatus function is received while the apparatus is implementing the communication control function and operating as the control apparatus, and a control unit configured to control operation of the apparatus such that priority is given to the apparatus function over the communication control function in a case that the determination unit determines that priority is to be given to the apparatus function over the communication control function.

22 Claims, 7 Drawing Sheets

(56) References Cited

U.S. PATENT DOCUMENTS

2012/0102497 A1* 4/2012 Stahl ........................ G06F 9/50
                                                          718/103
2012/0314693 A1* 12/2012 Medapalli et al. ........... 370/338
2012/0315929 A1* 12/2012 Oshinsky et al. ............ 455/458
2014/0295830 A1* 10/2014 Oerton ....................... 455/426.1

FOREIGN PATENT DOCUMENTS

| EP | 1883182 A1 | 1/2008 |
| JP | 2004-336401 A | 11/2004 |
| JP | 2007-067623 A | 3/2007 |
| JP | 2009-239371 A | 10/2009 |
| JP | 2011-044153 A | 3/2011 |

\* cited by examiner

COMMUNICATION APPARATUS, CONTROL METHOD FOR COMMUNICATION APPARATUS, IMAGING APPARATUS, CONTROL METHOD FOR IMAGING APPARATUS, AND PROGRAM

BACKGROUND OF THE INVENTION

Field of the Invention

The present invention relates to a communication apparatus, a control method for the communication apparatus, an imaging apparatus, a control method for the imaging apparatus, and a program.

Description of the Related Art

In a wireless communication such as a wireless Local Area Network (LAN) conforming to Institute of Electrical and Electronics Engineers (IEEE) 802.11 standard, a power saving communication mode is defined to reduce the power consumption of a communication apparatus.

As one of the power saving communication modes, a method for saving the power of an access point (control apparatus) is proposed. For example, Japanese Patent Application Laid-Open No. 2004-336401 discusses a method for saving the power of an access point. According to this method, an access point notifies a terminal apparatus in advance about a period during which data communication is not carried out and, during that period, the access point enters the sleep state in which the function of the wireless communication unit of the access point is stopped.

SUMMARY OF THE INVENTION

According an aspect of the present invention, a communication apparatus having a communication control function, which enables the apparatus to operate as a control apparatus that forms a wireless network and controls the wireless network, and having an apparatus function other than the communication control function, the communication apparatus includes a determination unit configured to determine whether priority is to be given to the apparatus function over the communication control function in the case that an instruction to implement the apparatus function is received while the apparatus is implementing the communication control function and operating as the control apparatus, and a control unit configured to control operation of the apparatus such that priority is given to the apparatus function over the communication control function in a case that the determination unit determines that priority is to be given to the apparatus function over the communication control function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For example, the technology discussed in Japanese Patent Application Laid-Open No. 2004-336401 can save the power of an access point. On the other hand, a recent trend is that mobile apparatuses, such as a notebook personal computer (PC), a smartphone, a mobile phone, and a camera, have the function to operate as an access point so that those mobile apparatuses operate as a mobile access point. The mobile apparatuses described above have functions other than an access point (e.g., PC function, phone function, imaging function). In addition, the mobile apparatuses described above are usually powered, not by commercial power, but by a battery. Therefore, a greater power saving is required on a mobile access point.

In addition, from a usability point of view, if a function (e.g., PC function, phone function, imaging function) other than an access point is requested by a user while an above-described mobile apparatus is operating as an access point, priority should be given to the operation requested by the user. Accordingly, while the mobile apparatus is operating as an access point, it is desired that the operation of the function (e.g., PC function, phone function, and imaging function) of a mobile apparatus can be controlled.

A communication apparatus in this exemplary embodiment has two distinctive functions: the control function to operate as a control apparatus for controlling a network and the apparatus function other than the control function. This communication apparatus is directed to controlling the operation (of the communication apparatus) to increase user convenience. Other objects will become apparent from the description and the drawings given below.

A communication apparatus in a first exemplary embodiment is described below in detail with reference to the drawings. Although a wireless LAN system conforming to the IEEE802.11 series is used as an example in the description below, the communication mode is not limited to a wireless LAN conforming to IEEE802.11.

Figure 1:
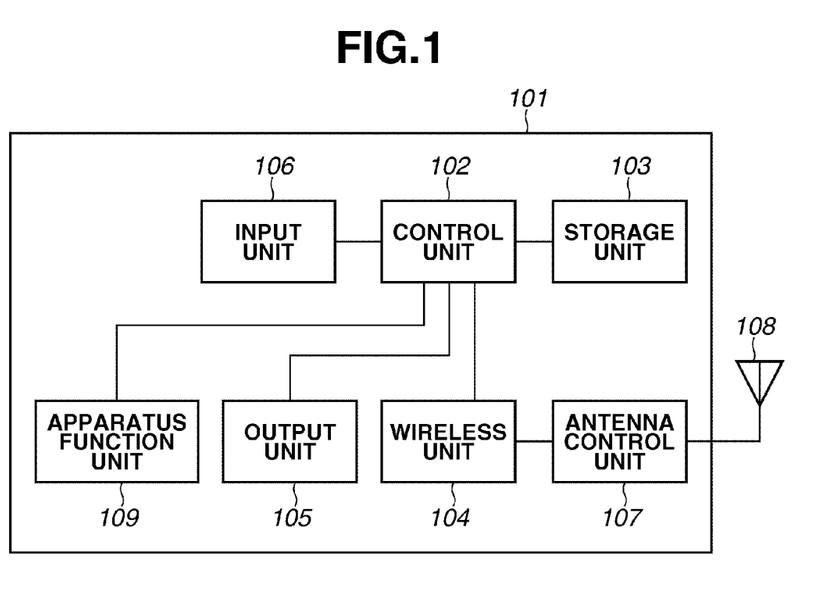
FIG. 1 is a diagram illustrating a block configuration of a communication apparatus in an exemplary embodiment of the present invention.

The following describes a hardware configuration of the communication apparatus in this exemplary embodiment with reference to FIG. 1. FIG. 1 is a block diagram illustrating an example of a configuration of the communication apparatus. A communication apparatus 101 includes a control unit 102, a storage unit 103, a wireless unit 104, an output unit 105, an input unit 106, an antenna control unit 107, an antenna 108, and an apparatus function unit 109.

The control unit 102 executes the control program, stored in the storage unit 103, to control the whole apparatus. The control unit 102 is configured by an operational device such as a central processing unit (CPU) and a microprocessor unit (MPU). The control unit 102 implements the functions, which are described later, by computing or processing information, or by controlling the hardware. The control unit 102 also controls communication parameter automatic setting that is carried out with other apparatuses.

Figures 4, 4A:
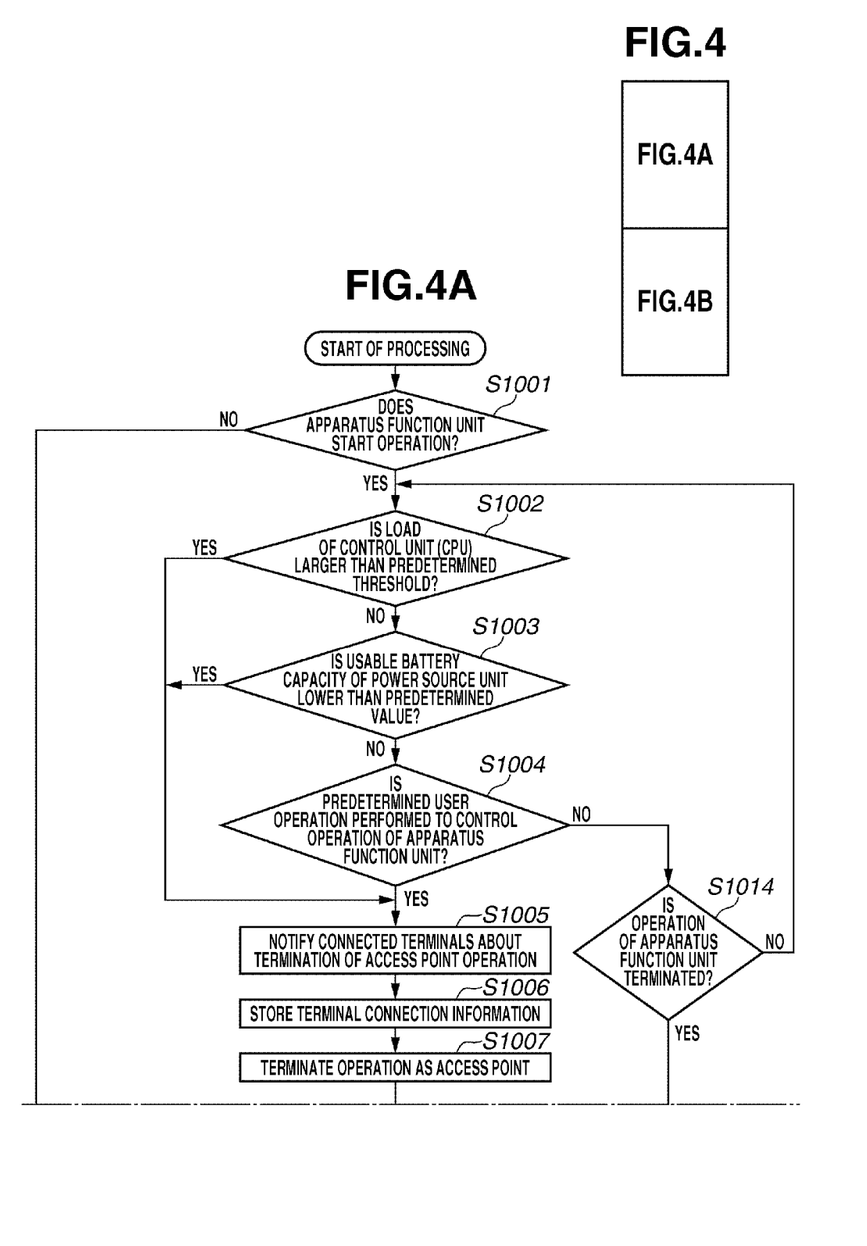
FIG. 4 is a diagram illustrating an operation flowchart of stop processing.
Figure 4B:
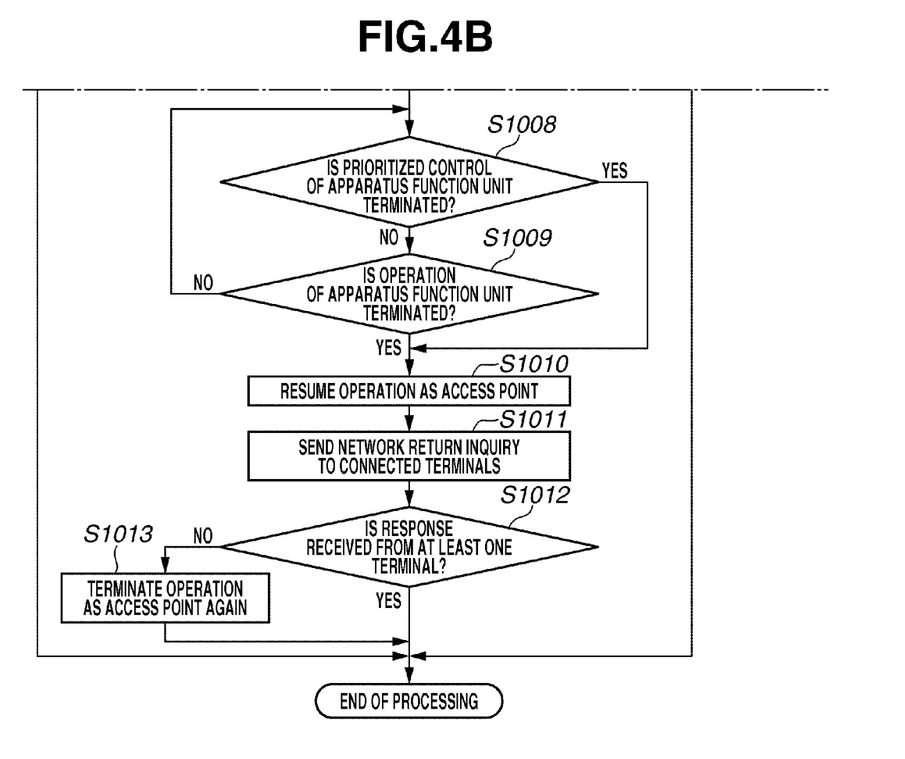

The storage unit 103 stores computer programs for the control performed by the control unit 102, and various types of information such as communication parameters. The operations described later are executed by the control unit 102 that executes the control program stored in the storage unit 103. The program for executing the stop processing, illustrated later in FIG. 4, is also stored in the storage unit 103. The storage unit 103 may be any one of the following: memory such as read-only memory (ROM) and random access memory (RAM), flexible disk, hard disk, optical disc, magneto-optical disc, compact disc read only memory (CD-ROM), compact disc recordable (CD-R), magnetic tape, non-volatile memory card, and digital versatile disc (DVD).

The wireless unit 104, configured by a wireless chip for carrying out wireless communication conforming to IEEE802.11, carries out wireless communication. The output unit 105 is configured by an interface for outputting various types of information. For example, the output unit 105 has the function of outputting a light-emission instruction to a visually recognizable element such as a light emitting diode (LED) provided on the apparatus, outputting a video signal to a display device such as a liquid crystal display (LCD), or outputting a voice to the speaker. The output unit 105 outputs the result of processing, which is described later, to the user.

Note that the LED, LCD, or speaker may be provided in the communication apparatus 101 or may be connected to the communication apparatus 101 via the output unit 105. The input unit 106 is configured by the operation buttons used by the user to perform various types of input operation. The antenna control unit 107 supplies a signal obtained by the antenna 108, to the wireless unit 104 and supplies a signal supplied from the wireless unit 104, to the antenna 108. The antenna 108 is used to send and receive high-frequency signals.

The apparatus function unit 109 is a device that implements a function (function other than the communication control function) different from the wireless communication function that allows the communication apparatus to operate as an access point (control apparatus) for building a network and controlling the network. For example, when a mobile apparatus 101 is a camera, the apparatus function unit 109 is configured by an imaging element, lens, and an analog to digital (A/D) conversion circuit to generate image data. The apparatus function unit 109 may also be configured to have the talk function used on a mobile phone, the smartphone function, and the music playback function for use as a music player. The apparatus function unit 109 may also be a program for performing a predetermined function such as a web browser or a game.

Figure 2:
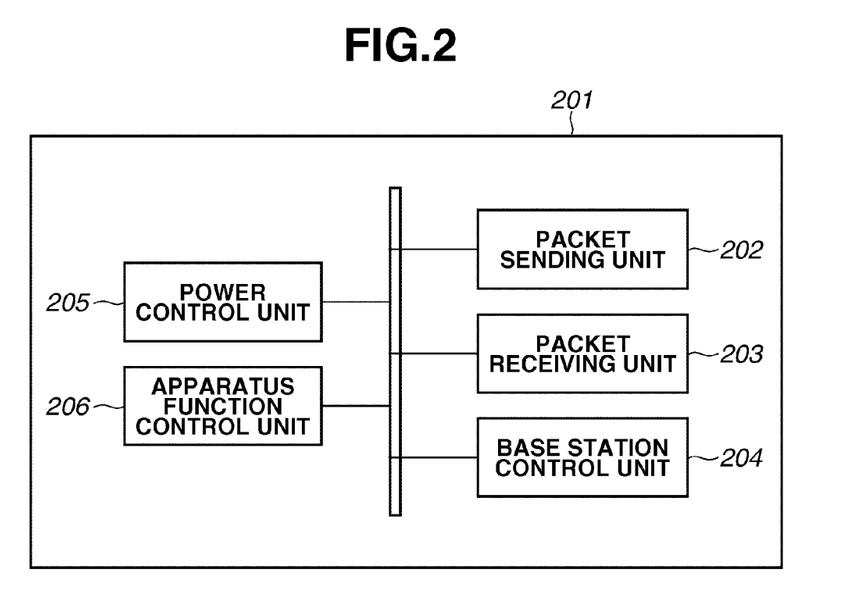
FIG. 2 is a diagram illustrating a functional configuration of the communication apparatus in the exemplary embodiment of the present invention.

Next, the following describes the configuration of the functional blocks with reference to FIG. 2. These functional blocks are implemented when the control unit 102 executes the control program stored in the storage unit 103, to control the hardware of the communication apparatus 101. In FIG. 2, an apparatus 201 indicates the whole apparatus. A packet sending unit 202 sends packets related to various communications. The packet sending unit 202 sends the signals described later. A packet receiving unit 203 receives packets related to various communications. The packet receiving unit 203 receives the signals described later.

A base station control unit 204 controls the operation of the apparatus 201 that works as an access point (base station). The base station control unit 204 performs the processing operation that is executed by an access point in a wireless LAN network; for example, the base station control unit 204 sends the beacon signal or connects to a terminal apparatus. An access point works as a control apparatus that has the communication control function to build a network and to control the network.

A power control unit 205 controls the supply of power from a power source unit to the hardware and acquires the state of the power source unit. The power control unit 205 controls the supply of power to each the hardware of the communication apparatus 101. More specifically, the power control unit 205 controls the supply of power from a power source unit (not shown) to the hardware and acquires the state of the power source unit. In addition, the power control unit 205 controls the power saving communication of an access point.

Although the sleep state, in which power supply to the communication circuit is stopped, is used in this exemplary embodiment as an example of the power saving state, the power saving state is not limited to the sleep state. More specifically, in the power saving state, power may be saved by reducing the sending power or by lengthening a sending interval at which a control packet is sent (so by lengthening a sending interval between control packets). The active state is a non power-saving state, and refers to a state in which the communication apparatus can communicate with a terminal apparatus. The power saving state refers to a state in which the power consumption is reduced as compared to the active state. An apparatus function control unit 206 controls the apparatus function unit 109 and acquires the operation state.

Figure 3:
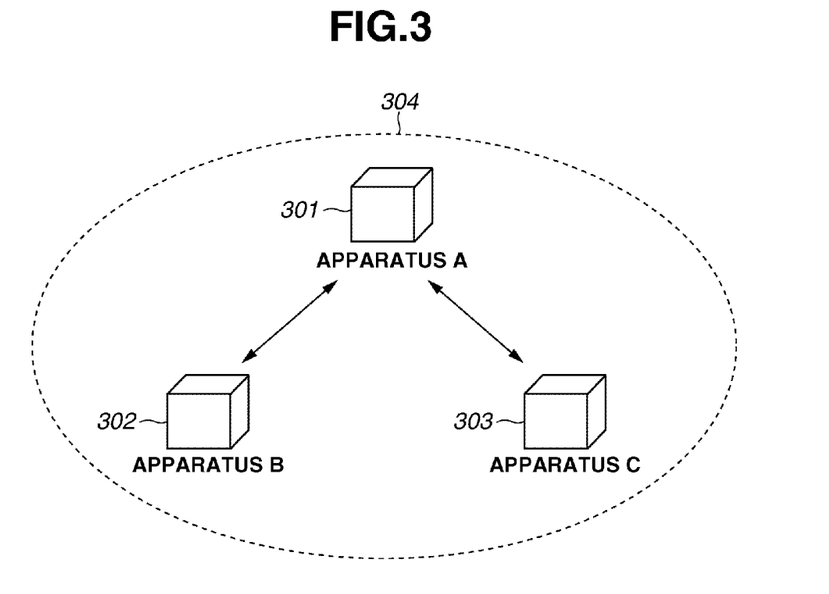
FIG. 3 is a diagram illustrating an example of a network configuration.

The following describes the operation of the communication apparatus 101 that has the configuration described above. FIG. 3 is a diagram illustrating a network 304 including an apparatus A 301, an apparatus B 302, and an apparatus C 303. The apparatus A 301 has the configuration of the communication apparatus 101 described in FIG. 1 and FIG. 2. The apparatus A 301 operates as an access point to build the network 304 for communication with the apparatus B 302 and the apparatus C 303. Each of the apparatus B 302 and the apparatus C 303, which operates as a terminal apparatus, connects to the network configured by the apparatus A 301, to communicate with the apparatus A 301. In addition, each of the apparatus B 302 and the apparatus C 303 communicates with other communication apparatuses connected to the network via the apparatus A 301.

Next, the following describes the stop processing, in which the apparatus A 301 stops the operation as an access point, with reference to the flowchart illustrated in FIG. 4. In the description below, it is assumed that the stop processing illustrated in FIG. 4 is executed when the apparatus A 301 operates as an access point. The stop processing may also be executed when the apparatus A 301 starts operating as an access point after the apparatus function unit 109 has started the operation.

In step S1001, the apparatus function control unit 206 determines whether the apparatus function unit 109 has started operation while the apparatus A 301 is operating as an access point. For example, if the apparatus A 301 is a camera, the apparatus function control unit 206 determines whether the shooting mode is set by a user instruction. The apparatus function control unit 206 also detects the click of the icon of a web browser or the click of an icon that executes a program for implementing a predetermined function. If the apparatus function unit 109 has not started any operation, this processing (so the processing as shown in FIG. 4) is terminated.

In step S1002, if the apparatus function control unit 206 has started the operation of the apparatus function unit 109, the control unit 102 determines its supposed (predicted) processing load and determines whether the processing load is larger than a predetermined threshold. When the apparatus function control unit 206 starts the control operation, a large processing load may be added to the control unit 102 because the control unit 102 must perform the control operation in addition to performing the processing as an access point.

The processing load, if too large, sometimes prevents the apparatus function unit 109 from properly performing its operation and the communication apparatus 101 from properly operating as an access point. To avoid this situation, the apparatus function control unit 206 determines what processing load will be added to the control unit 102 by the started apparatus function.

Based on the determination of the processing load that will be added to the control unit 102, the apparatus function control unit 206 determines to stop the operation of the apparatus A 301 as an access point in order to give priority to the operation of the apparatus function unit 109 if the processing load of the control unit 102 is larger than a predetermined threshold. After that, the operation proceeds to step S1005.

If the supposed processing load of the control unit 102 is smaller than the predetermined threshold, the operation proceeds to step S1003 upon determination that the processing can be performed without significant errors and delays even when the operation of the access point and the operation of the apparatus function unit 109 are performed concurrently.

As an example of specific processing in step S1002, the following describes how the apparatus function control unit 206 determines the processing load required for the PC function to execute an installed program. For each installed program, the apparatus function control unit 206 stores in advance the average CPU load, which is required for the execution, in the memory. The apparatus function control unit 206 determines whether the average CPU load exceeds a pre-set threshold and, based on the determination, stores a flag in the memory in association with the program. If the program is executed while the apparatus A 301 is operating as an access point, the apparatus function control unit 206 checks the stored flag to determine whether the processing load exceeds the predetermined threshold.

Next, in step S1003, the power control unit 205 determines the remaining battery capacity (usable power) of the power source unit, which supplies power to the hardware of the apparatus, to check if the remaining battery capacity is lower than a predetermined value. An insufficient remaining battery capacity of the power source unit may sometimes result in a power interruption before the apparatus function unit 109 completes a desired operation. Therefore, if the determination in step S1003 indicates that the remaining battery capacity of the power source unit is lower than a predetermined threshold, the apparatus function control unit 206 determines to stop the operation as an access point to give priority to the operation of the apparatus function unit 109. After that, the operation proceeds to step S1005. If the determination of the remaining battery capacity of the power source unit indicates that the remaining battery capacity is higher than a predetermined threshold, the operation proceeds to step S1004 upon determination that the remaining battery capacity is sufficient enough to perform the processing even if the operation as an access point and the operation of the apparatus function unit 109 are performed concurrently.

The predetermined value of the remaining battery capacity (usable power) of the power source unit is determined as follows. For example, when the apparatus function unit 109 provides the imaging function, the predetermined value may be set based on how many images can be imaged. As an example, the predetermined value of the remaining battery is the remaining battery capacity which is exhausted on average after 20 images are captured. Also, when the apparatus function unit 109 provides the mobile phone function, the predetermined value may be set based on the maximum standby time or the maximum talk time. As an example, the predetermined value of the remaining battery capacity is the remaining battery capacity which is exhausted after it has been in a standby status for five hours. As another example, the predetermined value of the remaining battery capacity is the remaining battery capacity which is exhausted after a telephone operation has been performed for one hour. The predetermined value may also be set based on a value indicating the percentage of the remaining battery capacity (usable power) of the fully charged power source unit (for example, 20% or lower).

Alternatively, as a predetermined value of the remaining battery capacity (usable power) of the power source unit, two or more thresholds may be variably set so that those values are used according to an apparatus function to be executed. For example, when the apparatus function is the function to image an image, the predetermined value may be set such that, when the remaining battery capacity (usable power) of the power source unit becomes lower than 20% of the fully charged capacity, the operation as an access point is stopped with priority given to the operation of the imaging function.

On the other hand, when the apparatus function is the function to browse images, the predetermined value may be set such that, when the remaining battery capacity (usable power) of the power source unit becomes lower than 10% of the fully charged capacity, the operation as an access point is stopped with priority given to the operation of the browsing function. In this way, the predetermined value may be set in such a way that the predetermined value used for determination in step S1003 is changed according to the type of the apparatus function executed in step S1001. Changing the threshold, used for checking the remaining battery capacity for each executed apparatus function, as described above allows the apparatus function to operate on a priority basis and, at the same time, reduces an improper (unnecessary) stop of the access point operation carried out to control the communication.

Next, in step S1004, the input unit 106 determines whether a predetermined user operation is performed. The predetermined user operation refers to a predetermined operation to control the apparatus function unit 109. For example, the predetermined user operation is an operation to press the release (activate) button (for example, an imaging instruction from the user) for the imaging function or to acquire a new web page for the web browser function. The predetermined user operation may also be an instruction operation to stop the operation as an access point.

If the apparatus A 301 detects a predetermined user operation, the operation proceeds to step S1005. In step S1004, if the input unit 106 does not detect a predetermined user operation, the operation proceeds to step S1014 upon determination that the operation as an access point is not stopped (i.e., that the operation of an access point is continued).

As an example of specific processing in step S1004, the following describes an example in which the apparatus A 301 is a camera. When the apparatus function control unit 206 is executing the function to browse image data stored in the storage unit 103, the input unit 106 determines whether a predetermined user operation for browsing moving image data is accepted. On the other hand, when an instruction to browse still image data is accepted, it may be determined that the apparatus A 301 will continue to operate as an access point.

Similarly, when the apparatus function control unit 206 is executing the imaging function, the input unit 106 determines that a predetermined user operation is performed if an instruction to record moving image data is accepted and, in this case, priority is given to the apparatus function unit 109. On the other hand, when an instruction to record still image data is accepted, it may be determined that the apparatus A 301 will continue to operate as an access point.

Similarly, when the apparatus function control unit 206 is executing the imaging function, the input unit 106 determines that a predetermined user operation is performed if an instruction to execute continuous shooting or special shooting is accepted and, in this case, priority is given to the apparatus function unit 109. Special shooting refers to shooting in the shooting mode in which the image processing is performed for a shot image to change the color tone or to add a special effect.

For example, an image captured in the special shooting mode increases its color saturation, converts its image to a monochrome or sepia image, or processes its image as if the image was captured by an old camera or a toy camera. On the other hand, when the imaging processing is performed for ordinary still image data, it may be determined that the apparatus A 301 will continue to operate as an access point.

Although the determination is made based on a user operation in the above description, it is also possible to make the determination according to the type of function that the apparatus function unit 109 will execute. For example, when the apparatus A 301 is a camera, it is also possible to determine that the determination is true when the imaging function is executed and that the determination is false when the image browsing function is executed.

In step S1005, when it is determined that the operation of the apparatus A 301 as an access point is terminated, the base station control unit 204 sends a message to the terminal apparatuses in the network via the packet sending unit 202 to notify that the apparatus A 301 will terminate the operation as an access point. In this exemplary embodiment, the apparatus A 301 sends a message to the apparatus B 302 and the apparatus C 303 indicating that the apparatus A 301 will terminate the operation as an access point.

In step S1006, the storage unit 103 stores the terminal connection information indicating the configuration of the current network. In the example illustrated in FIG. 3, the storage unit 103 stores the information, which indicates that the apparatus B 302 and the apparatus C 303 belong to the network, as the terminal connection information. The information necessary for the communication, such as a MAC address, is stored in the storage unit 103 as the terminal connection information.

Next, in step S1007, the base station control unit 204 terminates the operation as an access point. The termination of the operation as an access point in this exemplary embodiment means that the base station control unit 204 performs neither an operation necessary to maintain the network that is currently built nor an operation necessary to build a network that will be built in future. For example, when the operation as an access point is terminated, the base station control unit 204 stops sending the beacon (information signal). In addition, when the operation as an access point is terminated, the apparatus A 301 does not respond to a search request or a response request sent from other apparatuses. When the operation as an access point is terminated, the power control unit 205 stops supplying power to the communication circuit (for example, the communication circuit is a chip for communication in which an antenna and a calculation unit are integrated).

When the operation as an access point is terminated, the apparatus A 301 performs an operation different from the power saving mode; in other words, the apparatus A 301 performs no operation to return to the active state. For example, when the operation as an access point is terminated, the apparatus A 301 does not start the timer to return to the active state. In addition, when the operation as an access point is terminated, the network that has been built is terminated and the communication relay operation between the connected terminals is not performed.

When the operation as an access point is terminated, the apparatus B 302 and the apparatus C 303 may respond to a message indicating that the operation as an access point is terminated. However, the apparatus A 301 terminates the operation as an access point irrespective of whether a response is received from the apparatus B 302 and the apparatus C 303.

Next, in step S1008, the apparatus A 301 determines whether control for the prioritized operation for the apparatus function unit 109 may be terminated. The determination in step S1008 may vary according to steps S1002 to S1004, depending on whether the termination of the operation as an access point is determined. For example, if the operation as an access point is terminated by the determination in step S1002, the apparatus A 301 determines to terminate control for the prioritized operation of the apparatus function unit 109 if the processing load of the control unit 102 is smaller than a predetermined threshold.

If the operation as an access point is terminated by the determination in step S1003, a charging operation is started. The apparatus A 301 determines to terminate control for the prioritized operation of the apparatus function unit 109 if the remaining battery capacity of the power source unit becomes larger than a predetermined value. If the operation as an access point is terminated by the determination in step S1004, the apparatus A 301 determines to terminate control for the prioritized operation of the apparatus function unit 109 if the operation of the apparatus function unit 109 is terminated by a predetermined user operation.

For example, when the apparatus A 301 is a camera, the apparatus A 301 may determine to terminate control for the prioritized operation of the apparatus function unit 109 when the user presses the release button and the imaging processing is terminated. If the apparatus A 301 determines to terminate the control for the prioritized operation of the apparatus function unit 109, the processing proceeds to step S1010.

Next, in step S1009, the apparatus function control unit 206 determines whether the operation of the apparatus function unit 109 is terminated. If the operation of the apparatus function unit 109 is not yet terminated, the apparatus A 301 performs the processing in step S1008 again.

In step S1010, if the operation of the apparatus function unit 109 is terminated or if the apparatus A 301 determines to terminate control for the prioritized operation of the apparatus function unit 109 in step S1008, the base station control unit 204 resumes the operation as an access point. When the operation as an access point is resumed, the apparatus A 301 resumes sending the beacon (information signal). When the operation as an access point is resumed, the base station control unit 204 responds to a search request or a response request sent from other apparatuses.

Next, in step S1011, the base station control unit 204 sends a network return inquiry message to the connection terminals that were connected to the network before the operation as an access point was terminated. The base station control unit 204 sends the network return inquiry message to the terminal apparatuses and waits for a response for a predetermined period. If a response is received from at least one of the terminal apparatuses within the predetermined period, the base station control unit 204 rebuilds the network, over which communication was carried out before the operation as an access point was terminated, and terminates the processing.

In step S1012, if a response to the network return inquiry message is not received from any of the terminal apparatuses even after the predetermined period elapses, the base station control unit 204 recognizes that the terminal apparatuses will not return to the network and the processing proceeds to step S1013. In step S1013, if none of the connected terminal apparatuses returns to the network, the base station control unit 204 terminates the resumed network, terminates the operation as an access point again, and terminates the processing.

The information about various statuses may also be notified to the user via the output unit 105 according to the determination in step S1012. For example, the output unit 105 may output the video information or voice information, which includes a message such as "terminal apparatus B is reconnected to the network", and displays the message on the LCD or outputs the voice message from the speaker. In step S1012, the output unit 105 may output the video information or voice information, which includes a message such as "all terminals disconnect(ed) from the network", and displays the message on the LCD or outputs the voice message from the speaker.

As the network return inquiry message, a message may be sent to a terminal apparatus to check whether the terminal apparatus is still connected to (or is waiting for connection to) the terminated network.

In this exemplary embodiment, when the apparatus A 301 is operating as an access point, the apparatus A 301 terminates the operation as an access point as described above upon detecting that the apparatus function unit 109 has started a function that performs processing other than the communication processing. Because priority is given to the completion of the apparatus function operation, errors are reduced that may be generated during the apparatus function operation.

More specifically, since control of the operation of an apparatus function instructed by user is performed with priority over the operation as an access point, convenience of the user is improved. In other words, the communication apparatus has two functions: one is the control function enabling the communication apparatus to operate as an apparatus for controlling the network and the other is the apparatus function other than the control function. This configuration allows the communication apparatus to control the operation with convenience of the user increased.

Even while the apparatus A 301 is operating as an access point for controlling communication, the operation as an access point is forced to terminate to give priority to the function that is the primary operation of a battery-operated mobile apparatus. This configuration saves the apparatus resources, for example, reduces the power usage of the apparatus. In addition, the apparatus A 301 terminates the operation as an access point and releases the communication channels that have been used, thus saving the communication resources.

When the operation of the apparatus function is terminated, the apparatus A 301 resumes the operation as an access point and rebuilds the network that was used before the operation as an access point was terminated. Rebuilding the network in this way therefore reduces the inconvenience that may be created when the operation as an access point is terminated and communication cannot be carried out. In addition, if no terminal connects to the resumed network, the apparatus A 301 terminates the operation as an access point again and therefore saves the apparatus resources, for example, reduces the power usage of the apparatus. The apparatus A 301 terminates the operation as an access point and releases the communication channels that have been used, thus saving the communication resources.

According to the example given above, in the processing in step S1007, the operation as an access point is terminated to give priority to the operation of the apparatus function unit 109, however, the processing in step S1007 is not limited to this processing. For example, in the processing in step S1007, control may be performed such that the operation of the access point is moved to the power saving mode. In the power saving mode, control may be performed such as the sleep mode or the reduction in the transmission power of the beacon.

From the viewpoint of power saving, the control mode in which the access point operation is terminated is better than the control mode in which the access point operation is not terminated but moved to the power saving mode. However, in the latter control mode, an effect can be achieved that the function of an access point is maintained, more specifically, the network is still maintained and controlled with priority given to the operation of the apparatus function unit 109. In other words, in the control mode that does not terminate the access point operation, the communication with a terminal apparatus, which is connected to the established network, can be continued while maintaining the operation of the apparatus function unit 109.

It is also possible to determine whether the access point function is terminated or the access point operation is moved to the power saving mode according to the supposed value of the CPU load, the value of remaining battery capacity, or the type of user operation determined in steps S1002 to S1004. This configuration has the following advantages. For example, if the value of the CPU load is low enough to perform the operation of the access point in the power saving mode giving priority to the operation of the apparatus function unit 109, the operation of the apparatus function unit 109 may be carried out preferentially without terminating the network. On the other hand, if the value of the CPU load is large which generates a problem in the operation of the apparatus function unit 109 unless the operation as an access point is terminated, the operation as an access point is terminated to carry out the operation of the apparatus function unit 109.

If the value of the remaining battery capacity is large enough to perform the operation of the access point in the power saving mode giving priority to the operation of the apparatus function unit 109, the operation of the apparatus function unit 109 may be carried out preferentially without terminating the network. On the other hand, if the value of the remaining battery capacity is small which generates a problem in the operation of the apparatus function unit 109 unless the operation as an access point is terminated, the operation as an access point is terminated to carry out the operation of the apparatus function unit 109.

In the stop processing illustrated in FIG. 4, a sequence of processing in steps S1002-S1004 may be in any order. Only one of the determinations, or an arbitrary combination of determinations, may also be used.

In a second exemplary embodiment, when the apparatus A 301 is operating as an access point and, at the same time, the apparatus function unit 109 is operating, the operation as an access point is terminated if a predetermined operation is detected. In this exemplary embodiment, the predetermined operation to be detected is opening of the lid of a recording medium or a battery, issuance of an instruction to switch the mode to a non-communication mode, or a power-off operation.

The configuration of an apparatus in this exemplary embodiment is similar to that of the apparatus in the first exemplary embodiment except that a detection unit is provided. This detection unit detects one of the following operations: the battery cover, which is the lid covering a battery used as the power source, is opened or closed, the cover, which is the lid covering a recording medium, is opened or closed, an instruction is issued to switch the mode to a non-communication mode, or an power on/off instruction is issued.

The apparatus A 301 in this exemplary embodiment is configured such that, at the same time that the power is turned on, the operation (stationary operation apparatus function) of the apparatus function unit 109 is started. The stationary operation apparatus function is always running in a case that a power source of the apparatus is turned on. For example, when the apparatus is a mobile phone, the phone standby function is started; when the apparatus is a computer, the computer function is started. An operation mode can be set to the apparatus A 301. Only when the "communication mode" is set, the communication function becomes operable and the apparatus A 301 can operate as an access point. The following describes the operation of the apparatus A 301 in this exemplary embodiment with reference to the flowchart illustrated in FIG. 5.

Figures 5, 5A:
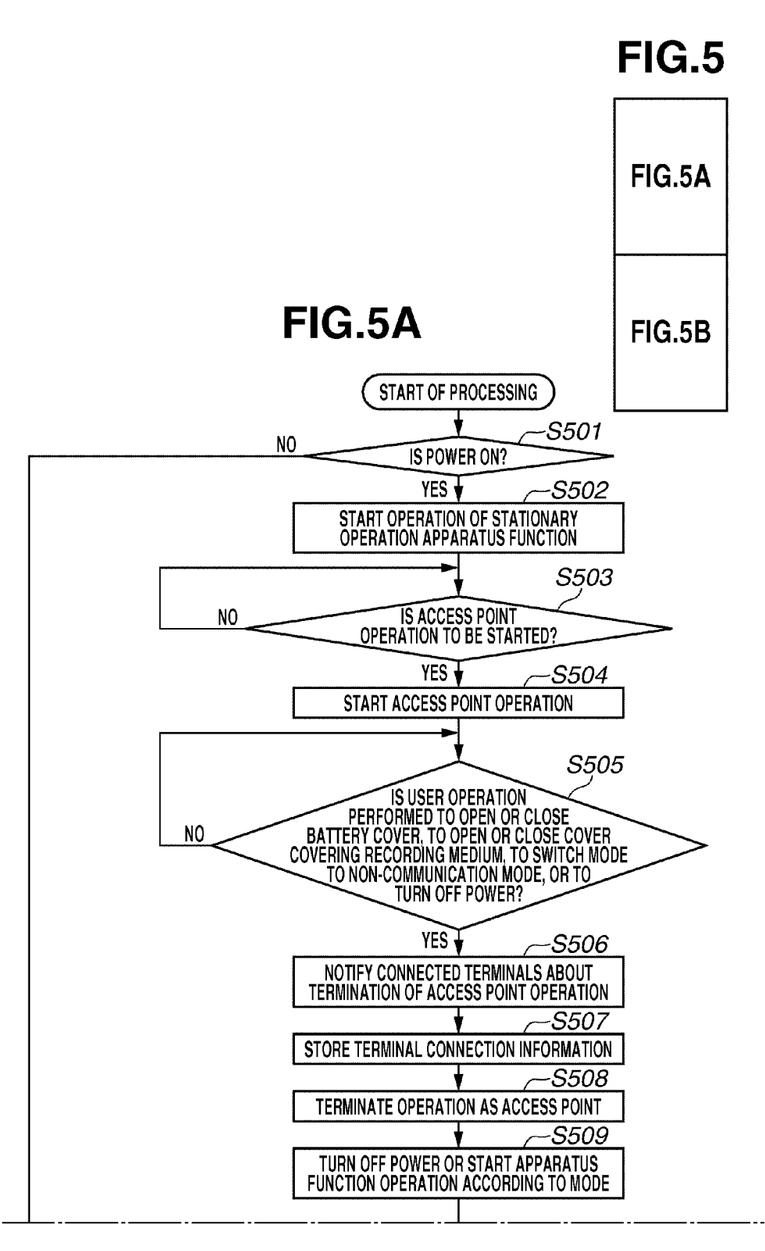
FIG. 5 is a flowchart illustrating an operation of an apparatus in a second exemplary embodiment.
Figure 5B:
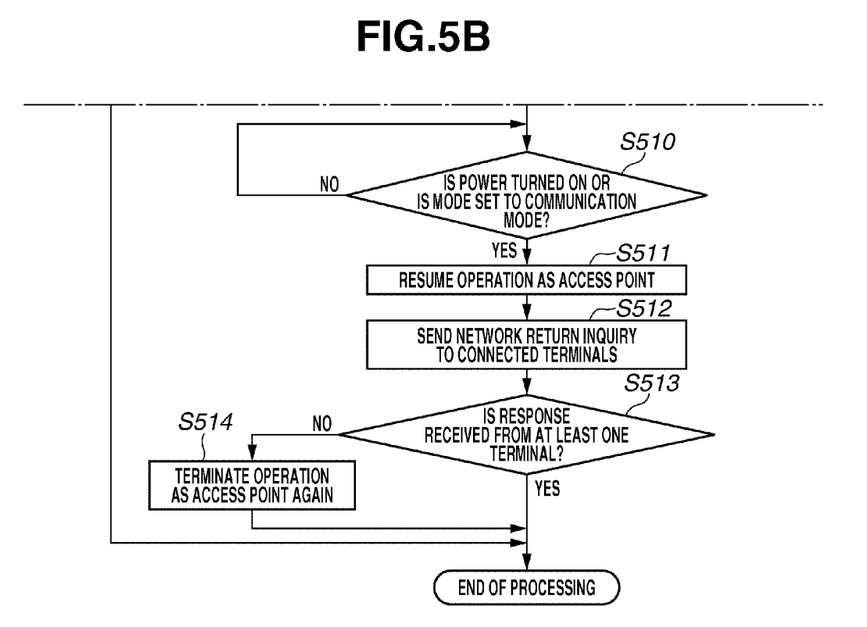

In step S501, the apparatus A 301 determines whether a power-on instruction operation has been performed. In step S502, the apparatus A 301 starts the operation of the apparatus function unit 109 (stationary operation apparatus function) at the same time that the power is turned on according to the present exemplary embodiment. Next, in step S503, the base station control unit 204 determines to start the access point operation when the user sets the operation mode to "communication mode". In step S504, the base station control unit 204, which has determined to start the access point operation, builds a network for communication with terminal apparatuses.

Next, in step S505, the apparatus A 301 determines whether a user operation has been performed to open the battery cover which is the lid covering the battery used as the power source, to open the cover which is the lid covering a recording medium, to switch the mode to a non-communication mode, or to issue an power off instruction. The apparatus A 301 is configured to turn off the power of the whole apparatus when the user performs one of the operations to open the battery cover which is the lid covering the battery used as the power source, to open the cover which is the lid covering a recording medium, and to issue an power off instruction. An instruction to switch the mode to a non-communication mode, if issued, indicates that the user explicitly wants to terminate the communication. When a user operation is performed to open the battery cover which is the lid covering the battery, to open the cover which is the lid covering a recording medium, to switch the mode to a non-communication mode, or to issue an power off instruction, the apparatus A 301 terminates the access point operation.

In step S506, when the apparatus A 301 determines to terminate the operation as an access point, the base station control unit 204 sends a message, which indicates that the operation as an access point will be terminated, to the terminal apparatuses (apparatus B 302, apparatus C 303) in the network via the packet sending unit 202. In step S507, the storage unit 103 stores the terminal connection information that indicates the configuration of the current network. In the example in FIG. 3, the storage unit 103 stores the information, which indicates that the apparatus B 302 and the apparatus C 303 belong to the network, as the terminal connection information. The information stored in the storage unit 103 as the terminal connection information is the information necessary for communication such as MAC addresses.

Next, in step S508, the base station control unit 204 terminates the operation as an access point (first termination). Next, if a user operation has been performed to open the battery cover, to open the cover which is the lid covering a recording medium, or to issue a power off instruction in step S505, the power control unit 205 stops the supply of power to the hardware to turn off the power of the apparatus (second termination).

In step S509, if the mode is switched to a non-communication mode in step S505, the power control unit 205 starts the operation of the apparatus function (second apparatus function) according to the mode. The second function is an apparatus function which is started upon detection of user's command while the power source is on. Next, the apparatus A 301 determines whether a user operation has been performed to close the battery cover, to close the lid covering a recording medium, or to turn on the power. In step S510, the apparatus A 301 determines whether the user has set the mode to the "communication mode" again.

Steps S511-S514 are performed if a user operation is performed to close the battery cover, to close the cover which is a lid covering a recording medium, or to turn on the power or if the user sets the mode to the "communication mode" again. The processing in steps S511-S514 is the same as steps S1010-S1013 described in the first exemplary embodiment and therefore the description is omitted here.

According to this exemplary embodiment, when a predetermined user operation that turns off the power or an operation that explicitly terminates the communication is detected, the apparatus terminates the operation as an access point as described above. Therefore, the apparatus operates as an access point only when the stationary apparatus function is in operation, which further enables saving of the power. If an instruction is issued to terminate the communication explicitly based on the user operation even when the apparatus is operating as an access point, the apparatus terminates the operation as an access point, thus increasing user convenience.

The apparatus operates as an access point only when the stationary apparatus function is in operation. Therefore, the operation as an access point is forced to stop even when the apparatus is operating as an access point for controlling communication, which saves the apparatus resources (for example, reduces the power usage of a battery powered mobile terminal apparatus). In addition, the apparatus terminates the operation as an access point and then releases the communication channels that have been used, which saves also the communication resources.

When the power is turned on again and the operation of the stationary apparatus function is resumed, the apparatus resumes the operation as an access point and rebuilds the network that was built before the operation was terminated. Rebuilding the network in this way therefore reduces the inconvenience that may be created when the operation as an access point is terminated and communication cannot be carried out. In addition, if no terminal connects to the resumed network, the apparatus terminates the operation as an access point again and therefore saves the apparatus resources, for example, reduces the power usage of the apparatus.

The mode is set to the "communication mode" according to the present exemplary embodiment to allow the apparatus to operate as an access point. However, another configuration is also possible in which it may be determined whether the apparatus will operate as an access point or a terminal after the mode is set to the "communication mode". In this case, after the mode is set to the "communication mode", it can be determined whether the apparatus will operate as an access point or a terminal according to a user's instruction or a negotiation with a communication partner apparatus.

In this case, if the mode is set to the "communication mode" again in step S510, the apparatus resumes the operation as an access point in step S511 even if the user's instruction is not received or the negotiation is not performed with the other end of the communication. This configuration allows the apparatus to determine its role automatically, considering the fact that the apparatus operated as an access point in the past. Thus, the need for receiving a user's instruction or for the negotiation with the other end of the communication is eliminated.

When the operation as an access point is terminated again in step S514, the apparatus starts operating as a terminal. Therefore, when a user's explicit instruction to set the mode to the "communication mode" is received, the apparatus tries to restore the network that was built before when the apparatus operated as an access point, so that it is possible to communicate quickly with the other end of the communication. If the network cannot be restored, the apparatus operates as a terminal after terminating the operation as an access point and then participates in another network to communicate with a predetermined apparatus. Accordingly, the apparatus respects a user's intention to communicate with a predetermined party.

While the exemplary embodiments of the present invention have been described, it is to be understood that the exemplary embodiments are only illustrative of the present invention and that the scope of the present invention is not limited to the described embodiments. Various changes and modifications may be made to the exemplary embodiments without departing from the scope of the present invention. An example of a wireless LAN conforming to IEEE802.11 is used in the above description. However, the present invention may be implemented in a communication mode in which Multi Band OFDM Alliance (MBOA), Bluetooth (registered trademark), or Ultra Wide Band (UWB) is used or in other wireless media and communication modes such as ZigBee. UWB includes wireless Universal Serial Bus (USB), wireless 1394, and Wireless Networks (WINET).

The embodiment can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The present invention may be implemented by executing the processing described below. Software (programs) that implements the function of the above-described exemplary embodiments is supplied, via a network or various types of storage medium, to a system or an apparatus where the computer (or CPU or MPU) thereof reads the program for execution.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-246704 filed Nov. 10, 2011, which is hereby incorporated by reference herein in its entirety.

What is claimed is:

1. A communication apparatus comprising:
a release member;
a memory;
a processor coupled to the memory which executes the following:
operating as an access point of a wireless network;
performing shooting in a case where an operation on the release member is detected;
detecting an operation on the release member while the communication apparatus is operating as the access point; and
terminating the operation as the access point according to the detection,
wherein the communication apparatus terminates the operation as the access point and performs shooting in priority to the operation as the access point.

2. A control method for a communication apparatus including a release member, the control method comprising:
operating as an access point a wireless network;
shooting in a case where an operation on the release member is detected;
detecting an operation on the release member in a case the communication apparatus is operating as the access point; and
terminating the operation as the access point according to the detection by the detection unit
wherein the communication apparatus terminates the operation as the access point and performs the shooting in priority to the operation as the access point.

3. A non-transitory storage medium storing a program for causing a computer to perform the control method according to claim 2.

4. The communication apparatus according to claim 1, wherein the communication control unit is configured to operate as an access point of the wireless local network.

5. The communication apparatus according to claim 1, wherein the communication control unit is configured to operate as an access point of an IEEE802.11 series.

6. The communication apparatus according to claim 1, wherein the termination unit is configured to terminate the operation as the access point even during communication with another communication apparatus when the communication control unit is operating as the access point.

7. The communication apparatus according to claim 1, wherein the termination unit is configured to terminate a wireless network formed when the communication control unit is operating as the access point.

8. The communication apparatus according to claim 1, further comprising a resuming unit configured to resume the operation as the access point in a case where shooting by the imaging unit is terminated after the termination unit terminates the operation as the access point.

9. The communication apparatus according to claim 1, wherein the termination unit is configured to terminate the operation as the access point in a case where a battery cover of the communication apparatus is opened.

10. The communication apparatus according to claim 1, wherein the termination unit is configured to terminate the operation as the access point in a case where a mode of the communication apparatus is changed from a communication mode to a mode different from the communication mode.

11. A communication apparatus comprising:
a memory;
a processor coupled to the memory which executes the following:
operating as an access point of a wireless network;
accepting a shooting instruction;
performing shooting in a case where the shooting instruction is accepted; and
terminating the operation as the access point in a case where the shooting instruction is accepted while operating as the access point.

12. The communication apparatus according to claim 11, wherein the communication apparatus performs shooting by the imaging unit in priority to the operation as the access point in a case where the termination unit terminates the operation as the access point.

13. The communication apparatus according to claim 11, wherein the communication control unit is configured to operate as an access point of the wireless local network.

14. The communication apparatus according to claim 11, wherein the communication control unit is configured to operate as an access point of an IEEE802.11 series.

15. The communication apparatus according to claim 11, wherein the termination unit is configured to terminate the operation as the access point even during communication with another communication apparatus when the communication control unit is operating as the access point.

16. The communication apparatus according to claim 11, wherein the termination unit is configured to terminate a wireless network formed when the communication control unit is operating as the access point.

17. The communication apparatus according to claim 11, wherein the termination unit is configured to terminate the operation as the access point in a case where an operation to remove a recording medium is detected.

18. The communication apparatus according to claim 11, wherein the termination unit is configured to terminate the operation as the access point in a case where a mode of the communication apparatus is changed from a communication mode to a mode different from the communication mode.

19. The communication apparatus according to claim 11,
wherein the input unit is configured to accept an input by an operation on a release button, and
wherein the imaging unit is configured to shoot a still image in a case where the input by the operation on the release button is accepted by the input unit.

20. The communication apparatus according to claim 11,
wherein the input unit is configured to accept an instruction for recording a moving image, and
wherein the imaging unit is configured to shoot a moving image to be recorded in a case where the instruction for recording the moving image is accepted by the input unit.

21. The communication apparatus according to claim 11, wherein the communication apparatus is configured to concurrently perform the operation of the communication control unit as the access point and shooting by the imaging unit in a case where predetermined shooting processing is performed by the imaging unit.

22. The communication apparatus according to claim 21, wherein the predetermined shooting processing is processing to shoot a still image.

* * * * *